March 11, 1958 — E. M. SALIBA — 2,826,361
TAPE-TYPE SLIDE RULE
Filed Oct. 29, 1956 — 4 Sheets-Sheet 1
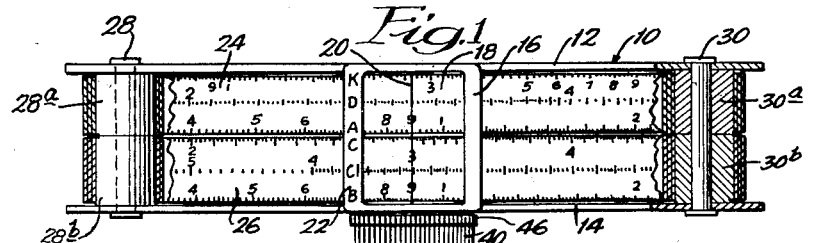
Fig.1
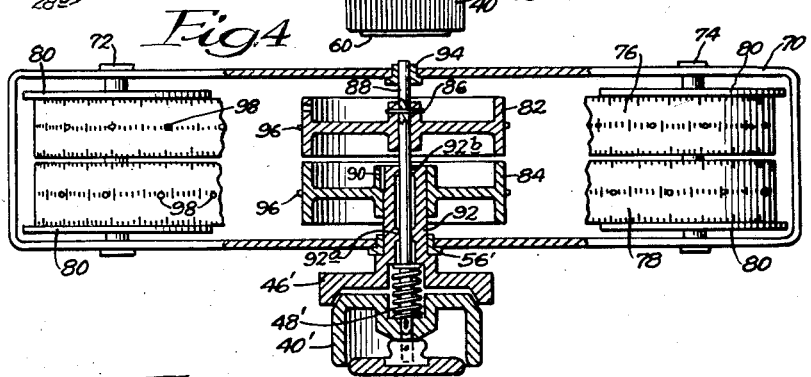
Fig.4
Fig.2
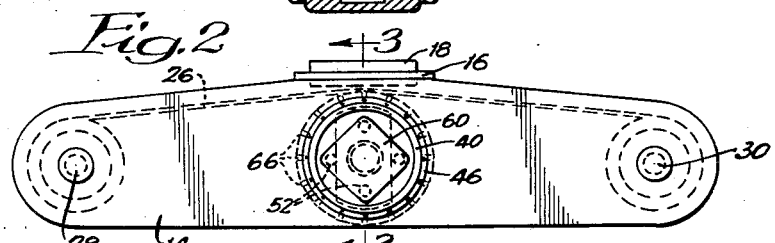
Fig.3
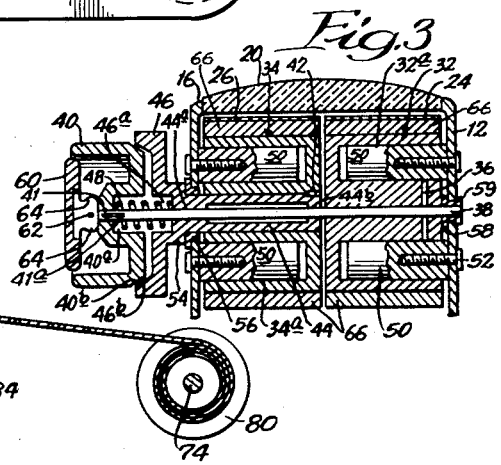
Fig.5
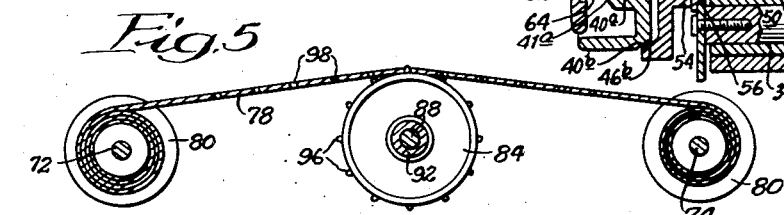
Fig.6
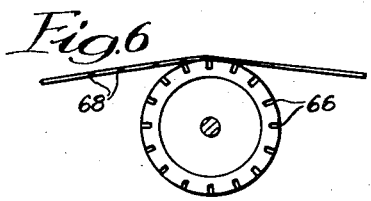
INVENTOR:
Edward Saliba,
BY Bair, Freeman & Molinare
ATTORNEYS.

March 11, 1958 E. M. SALIBA 2,826,361
TAPE-TYPE SLIDE RULE

Filed Oct. 29, 1956 4 Sheets-Sheet 2

INVENTOR:
Edward Saliba,
BY Bair, Freeman & Molinare
ATTORNEYS.

March 11, 1958 E. M. SALIBA 2,826,361
TAPE-TYPE SLIDE RULE
Filed Oct. 29, 1956 4 Sheets-Sheet 3
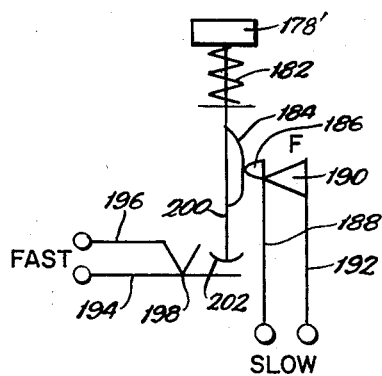
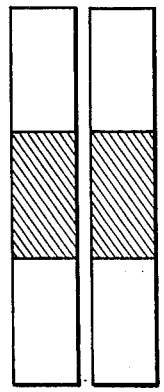
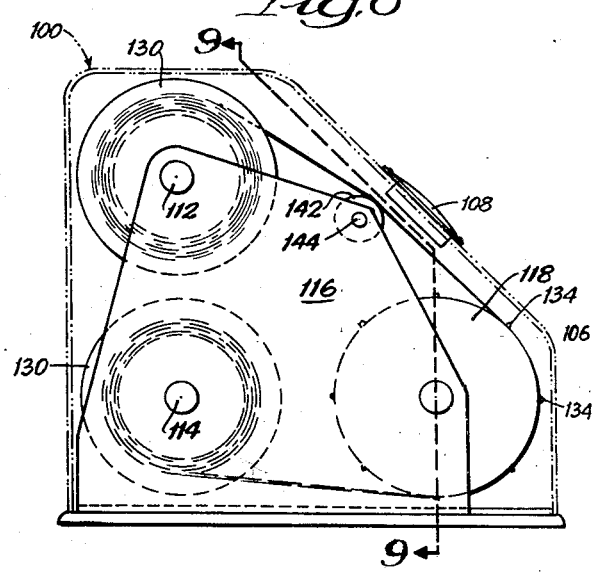
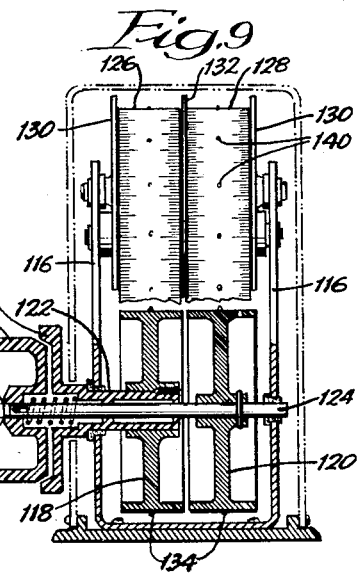
INVENTOR:
Edward Saliba,
BY Bair, Freeman & Molinare
ATTORNEYS.

March 11, 1958    E. M. SALIBA    2,826,361
TAPE-TYPE SLIDE RULE
Filed Oct. 29, 1956    4 Sheets-Sheet 4
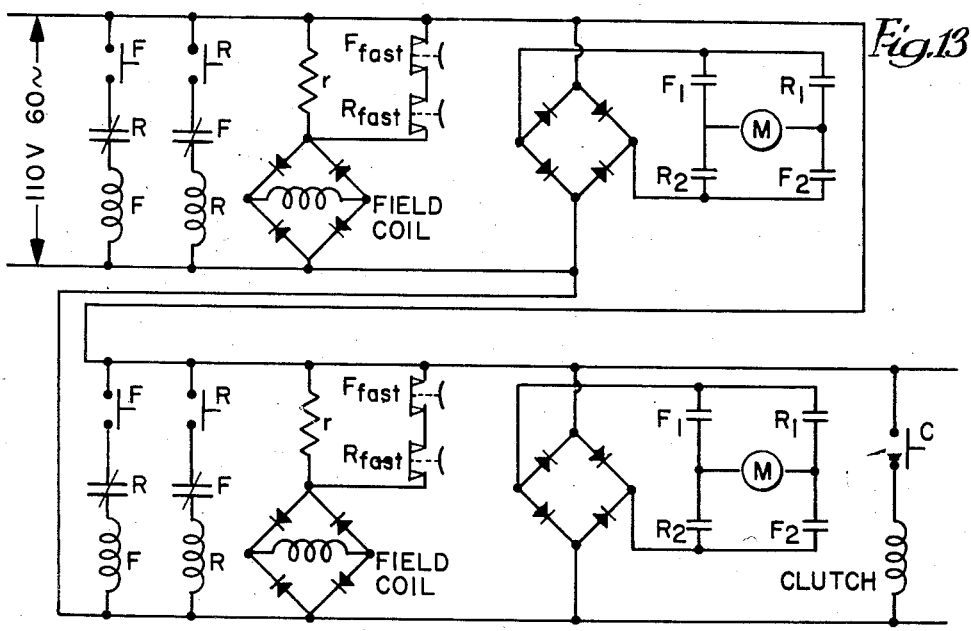
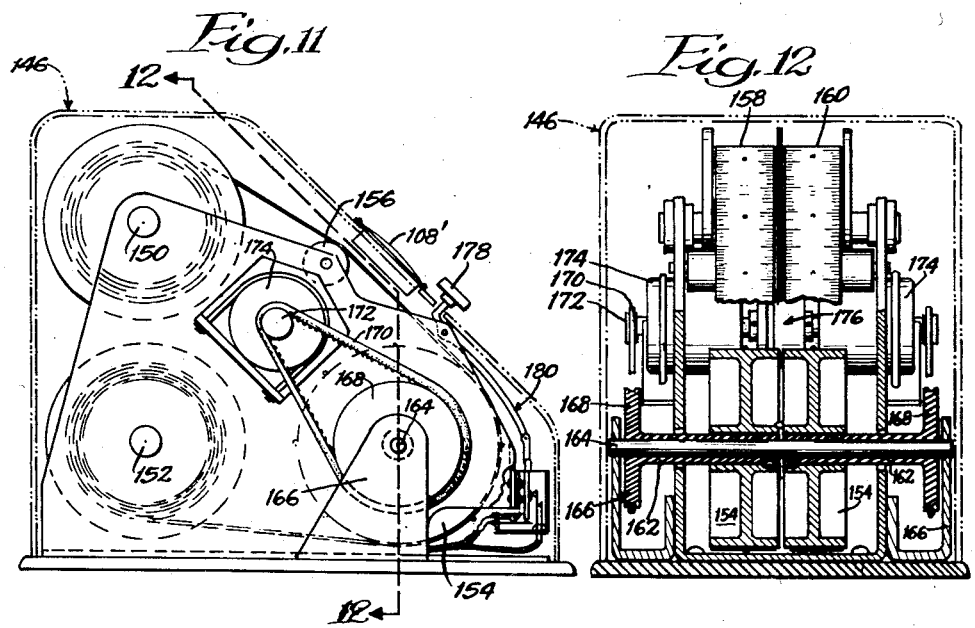
INVENTOR:
Edward Saliba,
BY Bair, Freeman & Molinare
ATTORNEYS.

2,826,361

TAPE-TYPE SLIDE RULE

Edward M. Saliba, Andover, Mass., assignor of thirty-three and one-third percent to Wendell M. Dillon, and thirty-three and one-third percent to Wendell M. Dillon, trustee, North Andover, Mass.

Application October 29, 1956, Serial No. 619,002

8 Claims. (Cl. 235—71)

This invention relates to a slide rule and more particularly to a slide rule whose movable elements thereof are of unusually great length.

The use of a slide rule to solve arithmetic problems involving multiplication, division, squares, square roots, proportions, percentages, trigonometrical functions, logarithmical functions, and combinations involving such matters has long been established. However, the restrictions imposed by the conventional slide rule, because of its length, limits the use of such a unit to calculations where accuracies beyond two and three significant figures cannot be performed.

Thus the engineer, mathematician, and other scientific personnel who perform calculations requiring greater accuracies than those possible with the conventional slide rule must resort to the use of the logarithm book. This is tedious, time-consuming work, and is subject to a certain degree of human error. The unsatisfied need for a slide rule which is accurate to four and five significant figures becomes quite evident.

It has heretofore been proposed to provide slide rules wherein the slide elements thereof are of unusual length so that the scales carried by the elements may be greatly expanded, thus permitting of additional subdivisions of the scales and increased accuracy of calculations. The conventional slide rule is 10 inches long, and obviously a slide rule of 300 inches in length will expand all the divisions thereof by 30 times. However, linear slide rules utilizing rigid elements cannot be made too long as they become unwieldy.

It has also been heretofore proposed to use flexible tapes of unusual length to serve as the elements of a slide rule of unusually great length. Such propositions generally center about some sort of a spool mechanism to which the ends of the tape could be connected, and upon which spools could be wound the excessive length of the slide rule elements. Of course, with such prior proposals, it is necessary to provide complex motor controls for the spools, and it is absolutely necessary to provide some sort of tensioning means which will maintain the spools under proper tension during the movement of the slide rule elements. Further, because of the fact that the diameter of the spool is constantly changing as the slide rule tape element is wound on or off, there must be provided means for compensating for variations in tension, for variations in peripheral speed of the spools and hence of the slide rule elements, and some sort of satisfactory clutching arrangement must be provided to maintain uniform movement of the two slide rule tape elements which may be under different tensions and which may be moving on or off two adjacent spools at different peripheral, and hence angular, velocities.

Where it has been suggested to use spirally wound resilient tapes of metal, or the like, as the slide rule elements, additional problems are posed by the facts: that the wind-up or wind-off torque of a spirally wound resilient tape varies through the entire length of spiral winding, that the ends of the tape must be anchored onto the spools therefor, that the spiral winding must provide for open space between the coils to allow for such winding, thus making the spiral bulky, that the force developed increases as the winding progresses, that the coil itself is stressed as the winding continues, that the stress of the coil is transmitted to the spool to which the coil is connected and hence the tendency of the spool to rotate must be resisted, that sufficient expansion space must be provided to accommodate the unwinding coil, and that there is undesirable inter-coil friction present during winding and unwinding which causes substantial power losses.

One of the objects of this invention is to provide a new and improved slide rule wherein the scale carrying elements thereof are of unusually great length and which slide rule avoids the aforenoted deficiencies.

It is another object of the invention to provide a new and improved slide rule wherein the scale carrying elements thereof are of unusually great length, and which slide rules may be provided either for manual operation or motor operation.

A further object of this invention is to provide a new and improved slide rule wherein the scale carrying tape elements thereof are of unusually great length and wherein said tapes are of stainless steel which are prestressed and preformed and which tapes are characterized by requiring only a substantially constant torque to be applied thereto to effect movement of the tapes regardless of the amount thereof wound on or off of a storage spool therefor.

It is an important and essential feature of this invention that there exists a tape which may, as a nonlimitative example, be formed of stainless steel which has been prestressed and preformed in a well known manner to provide a spring, or motor, which is known as a "neg'ator" type spring. Such a spring may be coiled onto or off of a spool, or drum, therefor and is characterized, inter alia, in that when wound on or off the spool it provides a force substantially constant throughout its entire deflection, it need not be connected at its ends to the spool and may normally be mounted for free rotation of the coil thereof on said spool, that the coil thereof is normally tightly wound with each coil in close contact with adjacent turns of the coil, thus providing for more compact storage and space requirements, and that there is no intercoil friction therein. Such tapes do exist and have heretofore been described in the technical literature, but no one until now has conceived of the use of these tapes as herein described, or in the particular combination herein described.

The foregoing described tape having the aforesaid desirable properties particularly lends itself to incorporation in a slide rule of the desired style, as the characteristics of the novel tape, to a great extent, obviate the aforedefined objectionable characteristics of spirally wound tapes which heretofore have been suggested for incorporation in slide rules of the desired style.

The following description of my invention will illustrate, in certain particular non-limitative examples, the manner in which my invention may be practiced to achieve the objects hereinbefore stated. Also, further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a top plan view of a manually operable slide rule constructed in accordance with this invention;

Figure 2 is an elevation view of the slide rule of Figure 1 and is taken looking substantially upwardly toward Figure 1;

Figure 3 is a cross-section view taken substantially on line 3—3 of Figure 2;

Figure 4 is similar to Figure 1 except that portions have been broken away so as to provide a cross-section view through the drive means of the slide rule, and shows a modified form of manually operable slide rule;

Figure 5 is a semi-diagrammatic view illustrating one form of drive for the tape elements of the slide rules herein disclosed;

Figure 6 is a fragmentary view similar to Figure 5 illustrating a modified form of drive which may be used in any of the forms of slide rule herein disclosed;

Figure 8 is a side view illustrating the apparatus within the housing of the device in Figure 7;

Figure 9 is a cross-section view taken substantially on line 9—9 of Figure 8;

Figure 11 is a side view of the interior of the housing of Figure 10;

Figure 12 is a cross-section view taken substantially on line 12—12 of Figure 11;

Figure 13 is a wiring diagram for the electrical control of the electrically operated slide rule of Figures 10-12;

Figure 14 is a semi-diagrammatical illustration of the three-position switch which is utilized in the device of Figures 10-13;

Figure 15 is a diagrammatical representation illustrating the relationship between the length of the operative portion of the tape utilized in the slide rules of this invention to the inoperative portions of the tape which are located at the ends of the tape.

Figure 7:
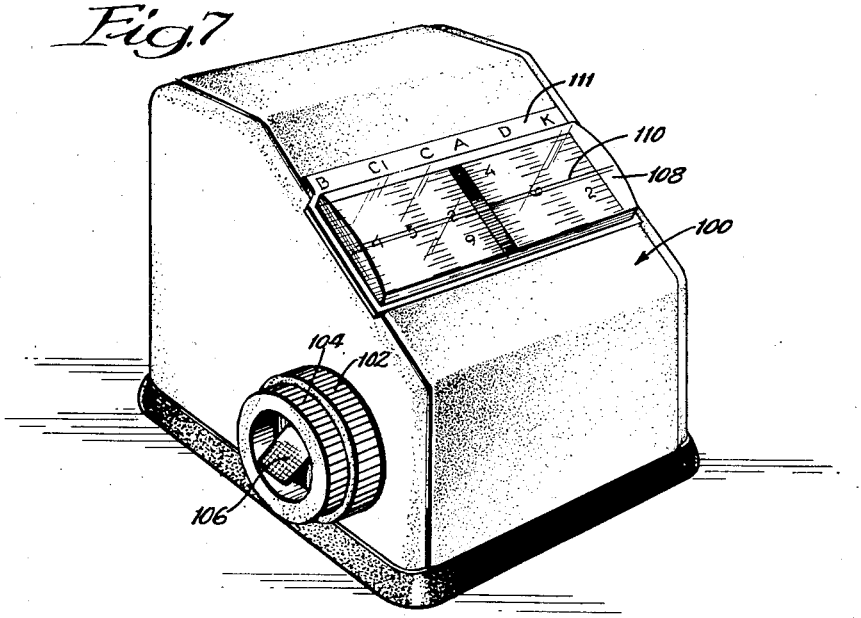
Figure 7 is a perspective view of a modified form of the manually operable slide rule of this invention.

Referring now to the drawings, there is shown in Figure 1 a first form of slide rule generally indicated at 10, and which includes a pair of spaced longitudinal frame members 12 and 14. Extending between the longitudinal frames 12 and 14, and connected thereto, is a rectangular indicator frame 16 which carries a sight glass 18 having a hairline 20. One side 22 of the indicator frame 16 carries thereon indicia which is adapted to cooperate with the scale markings carried on tapes that are adapted to move past the indicator frame and to be viewed through the sight glass 18.

The slide rule includes a first elongated tape 24 and a second elongated tape 26. Extending transversely between the spaced longitudinal frames 12 and 14, and carried thereby, is a pair of shafts 28 and 30. The shaft 28 may be referred to as the left-hand shaft and the shaft 30 as the right-hand shaft, said directions being related to the normal arrangement of the scales of a slide rule which normally run from left to right. The shaft 28 carries a pair of independently movable rollers 28a and 28b which are adapted to receive the left-hand ends of the tapes 24 and 26. Similarly, the shaft 30 carries a pair of independently movable rollers 30a and 30b adapted to receive the right-hand ends of the tapes 24 and 26.

Drive rollers are provided for moving the tapes 24 and 26 selectively, individually or in unison, to the left or right. A drive roller 32 is provided between the spaced shafts 28 and 30, and is disposed in the planes through the rollers 28a and 30a. The roller 32 is arranged to have a portion of the tape 24 trained thereover and in engagement therewith. Similarly a drive roller 34 is provided for the tape 26.

The drive rollers 32 and 34 are arranged so that they are coaxial. The drive roller 32 is connected by means of pin 36 to an elongated shaft 38 which is journalled at one end in the longitudinal frame 12. A control knob 40 is drivingly connected to shaft 38 by means of a pin 41 carried by shaft 38, and which pin extends through an axially elongated slot 41a in the control knob 40 to provide a lost-motion connection. The drive roller 34 is keyed at 42 to a hollow shaft 44 to which a control knob 46 is connected. The hollow shaft 44 provides a journal support for the elongated shaft 38 which extends therethrough, at points 44a and 44b.

The control knobs 40 and 46 are respectively recessed at 40a and 46a to provide an annular recess through which the shaft 38 extends and in which is positioned a helical, or coil, spring 48 which normally biases the control members 40 and 46 apart as best seen in Figure 3.

Each of the drive rollers 32 and 34 is provided with an annular recess respectively indicated at 32a and 34a. The spaced longitudinal frames 12 and 14 each carry a plurality of bearing rollers 50 which are adapted to extend into the annular recesses 32a and 34a and provide bearing surfaces upon which the drive rollers 32 and 34 may be rotated. The bearing rollers 50 are retained in position on frames 12 and 14 by means of threaded bolts 52.

The control knob 46 is provided with a shoulder 54 which is arranged to abut against a bearing collar 56, which collar 56 also provides a bearing on frame 14 for maintaining the hollow shaft 44 centered properly. The abutment of shoulder 54 against collar 56 also limits movement of the drive roller 34 in the direction toward the spaced drive roller 32. Appropriate washers 58 and 59 are provided for limiting movement of the drive roller 32 toward and away from the frame 12, so as to maintain the drive rollers 32 and 34 properly spaced.

The control knob 46 is of greater diameter than the control knob 40, thereby providing a portion of control knob 46 which lies outwardly of control knob 40. The control knobs 40 and 46 are shaped to define adjacent tapered annular walls 40b and 46b which are adapted to engage, when the control knob 40 is moved against control knob 46, so as to effect a frictional connection between the control knobs so as to cause same to rotate in unison.

Toward the end of forcing the control knob 40 toward the control knob 46, there is provided a clutch control member 60 which is pivotally mounted by means of pin 62 on shaft 38. The control member 60 is so shaped as to form cams 64 thereon which engage and force the control knob 40 toward the control knob 46 to effect said frictional engagement between said control knobs.

The means for effecting a drive of the tapes 24 and 26 by the drive rollers 32 and 34 may be in either of the forms shown in Figure 5 or 6. However, in Figure 2 there is specifically shown the drive which is shown in greater detail in Figure 6. The specific drive shown in Figures 2 and 6 includes a plurality of magnets or magnetic elements 66 which are fitted into the periphery of the drive rollers 32 and 34. These magnetic elements 66 are accurately located and uniformly spaced in the periphery of the drive rollers. Where the tapes are formed of a material that is responsive to the magnetic field of the magnets 66, then the tapes being trained over the magnet carrying rollers 32 and 34 is sufficient to cause an operative connection between the drive rollers and the tapes. Where the tapes are of a non-magnetic material, then means must be provided on the tapes for cooperating with the magnet carrying drive rollers. One solution would be incorporating a strip of magnetic material either in or on the tape. Another solution is shown herein as comprising a plurality of magnetic elements 68 which are either disposed in the tape itself or on the tape. These latter magnetic elements 68 are also uniformly spaced, and the spacing between adjacent elements 68 is the same as the peripheral spacing of the elements 66, so that there is accurate driving and registering engagement between the elements 66 and 68, and so as to effect a proper driving cooperation between the drive rollers and the tapes.

From the foregoing, it will be evident that there has been provided a slide rule including means for selectively rotating either of the tapes 24 and 26 in either direction, separately or in unison.

It will be understood that the tapes 24 and 26 are of the particular type hereinabove described and disclosed as an important and essential feature of this invention.

With respect to the modified form of invention shown in Figure 4, it will be seen that instead of the longitudinal frames 12 and 14 of Figure 1, there has been substituted a generally rectangular perimetral frame 70 upon which are mounted the left-hand shaft 72 and the right-hand shaft 74 which respectively carry the rollers upon which the tapes 76 and 78 are wound. The shafts 72 and 74 also carry side flanges 80 which are adapted to engage the adjacent edges of the tapes to keep said tapes properly aligned. In the modified form shown in Figure 4, there is shown a pair of drive rollers 82 and 84 which are provided respectively for the tapes 76 and 78. The drive roller 82 is connected by means of pin 86 to the elongated drive shaft 88. The drive roller 82 is connected by means of key 90 to a hollow shaft 92 which is concentric with shaft 88.

Whereas in the form shown in Figures 1–3 the drive rollers were rotatably mounted on rollers that were disposed in annular recesses of said drive rollers, the instant drive rollers 82 and 84 are respectively carried by the shafts 88 and 92 which are in turn supported by the frame 70. The shaft 92 is journalled in collar 56' carried by the frame 70. The shaft 88 is journalled at one point in collar 94 and journalled at two separate points in the hollow shaft 92 at points 92a and 92b. As in the previous form, the shafts 88 and 92 are provided with control knobs, 40' and 46' respectively, and a helical spring 48' is provided for normally biasing the control knobs 40' and 46' apart.

In the particular drive shown in Figure 4, the drive rollers 82 and 88 carry centrally thereof, on the perimeter of the rollers, a plurality of uniformly spaced and accurately located drive teeth 96. Each of the tapes 76 and 78 is provided with a plurality of accurately spaced apertures 98 disposed centrally of the tapes, and which apertures are properly spaced and arranged to cooperate with the drive teeth 96, as best seen in Figures 4 and 5.

In both of the forms of the invention shown in Figures 1–3 and in Figure 4, the drive rollers over which the tapes are trained are so located relative to the indicator hairline 20 that the portion of the drive roller over which the tapes are trained is located in substantially fixed relation to the hairline, so that the portion of the tape which is passing the hairline indicator is always at a substantially constant distance from the hairline indicator.

In a modified form of the invention shown in Figures 7–9, the slide rule is shown disposed in an enclosed casing generally indicated at 100. Outwardly of casing 100 there is provided an outer control knob 102, an inner control knob 104, and a pivotable clutch controlling member 106, which elements correspond respectively with the outer control knob 46, the inner control knob 40, and the clutch control member 60 shown in Figure 3. The casing 100 also carries a sight glass 108 which is provided with a hairline 110. A marked element 111, along the border of glass 108, is provided bearing indicia adapted to cooperate with the marked scales which appear on the tapes which pass the sight glass 108.

Referring more specifically to the arrangement of elements within the casing 110, reference is had to Figures 8 and 9 wherein it is seen that there is provided an upper shaft 112 and a lower shaft 114 which are supported on support plates 116 carried in the casing. The support plates 116 also provide means for supporting a pair of spaced drive rollers 118 and 120 which are respectively mounted on shafts 122 and 124 for rotation therewith. The elements of the drive connection comprising the drive rollers 118 and 120 and the shafts supporting same, and the control knobs associated therewith, will be seen to be substantially the same as that shown in Figure 4. It will be understood that the shafts 112 and 114 each carry a pair of separately rotatable rollers on to which portions of the tapes 126 and 128 may be coiled. The shafts 112 and 114 also carry side flanges 130 and center flanges 132 to effect the desired alignment of the tapes 126 and 128 relative to each other. The drive rollers 118 and 120 are provided with drive teeth 134 adapted for cooperation with uniformly spaced apertures 140 formed in the tapes 126 and 128.

Now, whereas in the form of invention shown in Figures 1–3 and Figure 4 the drive rollers for the tapes were located directly opposite the hairline of the indicator glass, in the instant arrangement it will be seen that the drive rollers 118 and 120 are not so disposed. In order that the portions of the tapes which pass the sight glass 108 will be located at a substantially constant distance from said sight glass 108, there has been provided auxiliary guide, or idling, rollers 142 located, relative to the drive rollers, on the side of the hairline 110 opposite to said drive rollers. These guide rollers 142 are rotatably mounted on a shaft 144 carried by the support plates 116. The foregoing arrangement is such that there is a substantially horizontal run between the point where the tapes are trained over guide rollers 142 and the point where the tapes engage the drive rollers 118 and 120. This provides that the tape is maintained substantially uniformly distant from the sight glass 108 and the hairline indicator 110.

Figure 10:
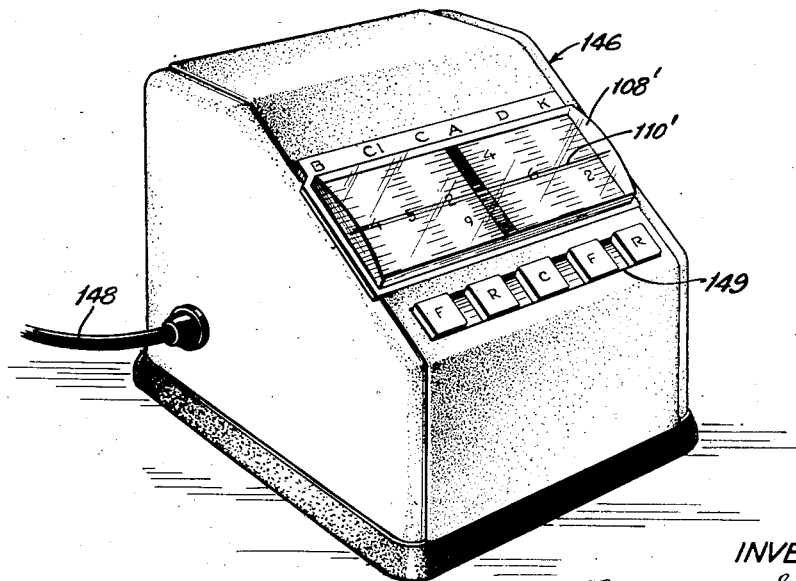
Figure 10 is a perspective view of a modified form of slide rule illustrating a slide rule that is electrically controlled.

In the next modified form of the invention shown in Figures 10 et seq., there is shown a casing 146 for the slide rule which is similar in many respects to the casing 100 of Figure 7. In the form shown in Figure 10 the tapes are electrically driven, while in the form shown in Figure 7 the tapes were manually rotated. Again, in Figure 10 the casing is provided with a sight glass 108' having a hairline 110'. A cord for connection to a source of electric energy is indicated at 148. A plurality of control buttons are provided in a recess 149 in the casing. The control buttons appear as F (forward) and R (reverse), and such control buttons are provided for each of the tapes seen through the sight glass 108'. A fifth control button (C) designates a clutch which operates to cause both of the tapes to be advanced in unison.

The apparatus shown in Figures 11 and 12 and located within casing 146 is in some respects similar to that shown in Figures 8 and 9. Again, there is provided an upper shaft 150 upon which are mounted a pair of separately rotatable rollers, onto which the left-hand end of the tapes are coiled. There is also the lower shaft 152 which carries the separately rotatable rollers upon which the right-hand ends of the tapes are coiled. A pair of separately rotatable drive rollers 154 are provided, and also a pair of guide rollers 156. The two tapes are respectively designated 158 and 160. The drive rollers are of the type provided with teeth, and the tapes are of the type that are apertured for cooperation with said teeth on the drive rollers.

A separate motor control is provided for each of the drive rollers 154. Each drive roller is drivingly connected to a hollow shaft 162, and the pair of shafts 162 are rotatably mounted on a stationary shaft 164 carried by support members 166. Each hollow shaft 162 is connected to a sprocket 168 over which is trained a drive belt 170 and which drive belt in turn is trained over the drive sprocket 172 driven by a motor 174. Preferably, the drive belt 170 is of the type formed with teeth along the inner periphery thereof and which is adapted for cooperation with teeth formed both in the sprocket 166 and in the drive sprocket 172 driven by motor 174. This insures an accurate non-slipping drive between the motor 174 and the drive roller 154.

The two motors 174 may be clutched together for unitary movement either by a mechanical clutching means as indicated at 176 in Figure 12, or by an electrical clutching arrangement as shown in Figure 13 wherein the circuits of the two motors are energized in parallel to effect simultaneous movement of both motors in unison.

The control of the motor drive for each of the drive rollers 154 is partially illustrated in Figure 11 and is more fully illustrated in Figures 13 and 14. The control button 178 in Figure 11 is shown connected by means of linkage 180 to a switching mechanism which is more fully disclosed in Figure 14. Reference is had to Figures 13 and 14 for the disclosure of an energizing circuit and switch control therefor which will effect the proper operation of the electric motors 174 disclosed herein for use in the electrically energized and controlled slide rule disclosed in Figures 10–12.

Reference is first had to Figure 14 which shows, semi-diagrammatically, a switch which is desired to be used in the operation of the motor drive. In Figure 14 there is a switch push button 178' adapted for manual operation. The switch is normally biased to an "Up" position by the spring 182. The switch stem carries a cam member 184 which, when fully withdrawn, is out of engagement with a cam follower 186 carried by the switch blade 188. The switch blade 188 is normally biased away from the contact point 190 carried by the switch blade 192. There is also shown a pair of switch blades 194 and 196 which are normally in engagement with each other at 198. The push button 178' has an extended stem 200 with an insulated tip 202 adapted to engage an extended portion of blade 194 to effect opening of the blades 194 and 196.

Now in the operation of the switch of Figure 14, when the switch is in the normal raised position, there is no electrical connection between the switch blades 188 and 192 but there is electrical connection between switch blades 194 and 196. As the push button 178' is depressed, the cam 184 engages cam follower 186 carried by blade 188 and effects a closure of the switch blades 188 and 192. When that occurs, there will be an energization of the motor and there will be fast rotation thereof. Upon further depression of the button 178', the insulator tip 202 will engage blade 194 and effect opening of that switch by separation of the switch blades 194 and 196. As can be seen in Figure 13, when the "Fast" switch blades 194 and 196 are engaged, the resistance "r" is shunted, but when the blades 194 and 196 are separated, then the resistance "r" is thrown into series with the circuit of the field coil and that will cause the motor to rotate at a slower speed. Thus, the switch shown in Figure 14 has an off position, a fast position when it is partially depressed, and a slow position when it is fully depressed.

As can be seen in Figure 10, a separate button is provided for both forward and reverse operation of each motor, and each said button provides for the two speed control.

As best seen in Figure 13, the two controls for the motors 174 are connected in parallel and each is arranged so that each may operate its motor individually. There may be further provided an electric clutch control "c" which operates, when depressed, to connect the motor circuits in parallel so that the operation of the controls of only one motor operates to control both motors simultaneously. While a particular electric clutching arrangement is shown in Figure 13, it will be obvious that a mechanical clutching arrangement for motors 174 could also be provided. It is believed that the remainder of the energization circuit shown in Figure 13 will be readily understandable to those skilled in the art.

Figure 15 is a graphic representation illustrating the relative proportions of the various portions of the tapes which carry the slide rule scales thereon. Considering the shaded portion as that which carries a full set of scales marked thereon, the said marked portion is compared to the overall length of tapes necessary to permit of locating each of the marked portions of one tape relative to each of the marked portions of the other tape. It will be seen that the marked, or scaled, portions of each tape occupy approximately one-third of the overall length of the tape to permit of all necessary positionings between the tapes. The end portions of the tape, which are each approximately one-third the overall length of the tape, are readily carried in coiled condition on the rollers that are provided for the tape.

While there has been shown and described a particular embodiment of this invention, it will be obvious to those skilled in the art that various changes and modifications may be made therein without departing from the invention, and, therefore, it is intended in the appended claims to cover all such changes and modifications as fall within the true spirit and scope of the invention.

What I claim as new, and desire to secure by Letters Patent of the United States, is:

1. A slide rule of great length comprising, in combination, a pair of adjacent, parallel, elongated tapes, each tape having at least one linearly expanded scale marked thereon for cooperation with a linearly expanded scale on the other tape, said tapes being pre-formed of a normally coiled pre-stressed material which is constructed to be moved in response to a substantially constant torque applied anywhere along the entire length of said tape, a pair of spaced spool means for each coiled tape upon which said tapes may be wound on and off, a drive member for each tape disposed between the pair of spools upon which each tape is wound, means for selectively rotating each drive member separately, and means for rotating the drive members in unison.

2. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, means for selectively rotating each drive member separately, and means for selectively rotating said drive members in unison.

3. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, each said drive member comprising a cylinder having a plurality of accurately located and uniformly spaced drive teeth formed thereon, each tape having formed therein, along the length of said tape, a plurality of uniformly spaced apertures arranged for cooperation with said drive teeth on the cylinder over which said tape is trained, means for selectively rotating each drive member separately, and means for selectively rotating said drive members in unison.

4. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, each said drive member comprising a cylinder having a plurality of accurately located and uniformly spaced magnetic elements disposed in the periphery thereof, each tape having formed therein a plurality of uniformly spaced magnetically responsive areas arranged for cooperation with the magnetic elements in the periphery of the drive member over which said tape is trained, means for selectively rotating each drive member separately, and means for selectively rotating said drive members in unison.

5. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, a first shaft drivingly connected to one of said drive members for rotation therewith, a second hollow shaft concentric with said first shaft and rotatably mounted thereon and drivingly connected to the second of said drive members for rotation therewith, first and second control knobs, respectively for said first and second shafts, arranged in concentric adjacent relationship, means including said control knobs for selectively rotating each drive member separately, and means for selectively rotating said drive members in unison.

6. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, a first shaft drivingly connected to one of said drive members for rotation therewith, a second hollow shaft concentric with said first shaft and rotatably mounted thereon and drivingly connected to the second of said drive members for rotation therewith, first and second control means, respectively for said first and second shafts, arranged in concentric adjacent relationship, at least one of said control means being arranged to move axially into clutching engagement with the other control means, means normally biasing said control means apart, cam means for overcoming said bias and for locking said control means in engagement to permit of rotating said control means in unison, means including said control means for selectively rotating each drive member separately and means including said cam means for selectively rotating said drive members in unison.

7. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, a separate electrically energized motor means for each drive member for selectively driving same, and means for selectively coupling said pair of motor means to cause said drive members to rotate in unison.

8. A slide rule comprising, in combination, a pair of adjacent, parallel, elongated tapes having marked thereon a plurality of greatly expanded slide rule scales, each tape having at least one scale thereon arranged for cooperation with one scale on the other tape, a pair of spaced spools for each tape arranged to have normally coiled portions of said tape wound thereon, and having at all times an exposed portion of said tape extending between said spaced spools, said tape being constructed and arranged to be normally coiled and characterized by the property that a substantially constant torque is required to effect movement of said normally coiled tape off from one spool and onto the other spool regardless of the amount of tape that is wound onto either spool, a drive member for each tape arranged to have a segment of said exposed portion of the tape trained thereover, cooperating means on said tape and said drive member for effecting a non-slip driving connection therebetween for selective advance of said tape in either of opposite directions, means arranging a hairline indicator relative to the pair of tapes and past which indicator the tapes may be caused to move, means including rollers positioned adjacent said hairline indicator for maintaining the portions of the tapes which pass said hairline indicator at a substantially constant distance from said hairline indicator, a first shaft drivingly connected to one of said drive members for rotation therewith, a second hollow shaft concentric with said first shaft and rotatably mounted thereon and drivingly connected to the second of said drive members for rotation therewith, first and second control knobs, respectively for said first and second shafts, arranged in concentric adjacent relationship, means including said control knob for selectively rotating, each drive member separately, and means for selectively rotating said drive members in unison.

References Cited in the file of this patent
UNITED STATES PATENTS

| | | |
|---|---|---|
| 457,343 | Edison | Aug. 11, 1891 |
| 493,858 | Edison | Mar. 21, 1893 |
| 1,068,982 | Connio | July 29, 1913 |
| 1,777,692 | Fuss | Oct. 7, 1930 |
| 1,906,456 | Farrand | May 2, 1933 |
| 2,468,582 | Willard | Apr. 26, 1949 |
| 2,527,776 | Taaffe | Oct. 31, 1950 |